US010194189B1

(12) United States Patent
Goetz et al.

(10) Patent No.: US 10,194,189 B1
(45) Date of Patent: Jan. 29, 2019

(54) PLAYBACK OF CONTENT USING MULTIPLE DEVICES

(71) Applicant: Amazon Technologies, Inc., Reno, NV (US)

(72) Inventors: Jeromey Russell Goetz, Seattle, WA (US); Fredrik Magnus Blomqvist, Seattle, WA (US); Ike Eshiokwu, Seattle, WA (US); Adam David Gray, Seattle, WA (US); William Richard Komarek, Seattle, WA (US); Lorne Millwood, Seattle, WA (US); Willie Morris, Seattle, WA (US); Dat Tien Nguyen, Seattle, WA (US); John Russell Seghers, Woodinville, WA (US); Michael Steffen Vance, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 490 days.

(21) Appl. No.: 14/034,055

(22) Filed: Sep. 23, 2013

(51) Int. Cl.
    *H04N 21/41*   (2011.01)
    *H04N 21/43*   (2011.01)
    *H04N 21/8547* (2011.01)

(52) U.S. Cl.
    CPC ..... *H04N 21/4122* (2013.01); *H04N 21/4307* (2013.01); *H04N 21/8547* (2013.01)

(58) Field of Classification Search
    CPC ........... H04N 21/4122; H04N 21/4307; H04N 21/8547
    USPC .......................................... 725/80, 141, 153
    See application file for complete search history.

(56) References Cited

U.S. PATENT DOCUMENTS

| | | |
|---|---|---|
| 5,596,705 A | 1/1997 | Reimer et al. |
| 5,692,212 A | 11/1997 | Roach |
| 6,065,042 A | 5/2000 | Reimer et al. |
| 7,293,275 B1 | 11/2007 | Krieger et al. |
| 7,444,593 B1 | 10/2008 | Reid |
| 8,209,396 B1 | 6/2012 | Raman et al. |
| 8,644,702 B1 | 2/2014 | Kalajan |
| 2002/0059610 A1 | 5/2002 | Ellis |
| 2005/0160465 A1 | 7/2005 | Walker |
| 2006/0015818 A1 | 1/2006 | Chaudhri et al. |
| 2006/0271836 A1 | 11/2006 | Morford et al. |

(Continued)

OTHER PUBLICATIONS

U.S. Appl. No. 13/227,097 entitled "Synchronizing Video Content With Extrinsic Data" filed Sep. 7, 2011.

(Continued)

*Primary Examiner* — Kunal Langhnoja
(74) *Attorney, Agent, or Firm* — Thomas | Horstemeyer, LLP

(57) ABSTRACT

Disclosed are various embodiments that facilitate playback of content via multiple display devices. Playback may be synchronized among multiple display devices and/or auxiliary content rendered by a companion device may be synchronized to playback of content by a primary device. A server device receives a request from a first client device to commence a playback of a content feature upon an identified second client device. The server device sends an instruction to the second client device to commence the playback of the content feature upon a display of the second client device in response to the request. Status updates regarding the playback may be provided to the first client device by the server device.

14 Claims, 12 Drawing Sheets

(56) References Cited

U.S. PATENT DOCUMENTS

| | | | |
|---|---|---|---|
| 2007/0250901 A1 | 10/2007 | McIntire et al. | |
| 2008/0002021 A1 | 1/2008 | Guo et al. | |
| 2008/0066135 A1 | 3/2008 | Brodersen et al. | |
| 2008/0172293 A1 | 7/2008 | Raskin et al. | |
| 2008/0209465 A1 | 8/2008 | Thomas et al. | |
| 2009/0094113 A1 | 4/2009 | Berry et al. | |
| 2009/0138906 A1 | 5/2009 | Eide et al. | |
| 2009/0228919 A1 | 9/2009 | Zott et al. | |
| 2010/0153831 A1 | 6/2010 | Beaton | |
| 2010/0199219 A1 | 8/2010 | Poniatowski et al. | |
| 2011/0067061 A1 | 3/2011 | Karaoguz et al. | |
| 2011/0131520 A1 | 6/2011 | Al-Shaykh et al. | |
| 2011/0154405 A1 | 6/2011 | Isaias | |
| 2011/0181780 A1* | 7/2011 | Barton | 348/563 |
| 2011/0246495 A1 | 10/2011 | Mallinson | |
| 2011/0282906 A1 | 11/2011 | Wong | |
| 2011/0296465 A1* | 12/2011 | Krishnan | H04N 21/4355 725/51 |
| 2012/0033140 A1 | 2/2012 | Xu | |
| 2012/0072953 A1 | 3/2012 | James et al. | |
| 2012/0151530 A1 | 6/2012 | Krieger et al. | |
| 2012/0210205 A1 | 8/2012 | Sherwood et al. | |
| 2012/0308202 A1 | 12/2012 | Murata et al. | |
| 2013/0014155 A1 | 1/2013 | Clarke et al. | |
| 2013/0021535 A1* | 1/2013 | Kim et al. | 348/738 |
| 2013/0060660 A1 | 3/2013 | Maskatia et al. | |
| 2013/0115974 A1 | 5/2013 | Lee et al. | |
| 2013/0291018 A1* | 10/2013 | Billings et al. | 725/46 |

OTHER PUBLICATIONS

U.S. Appl. No. 13/601,267 entitled "Enhancing Video Content With Extrinsic Data" filed Aug. 31, 2012.

U.S. Appl. No. 13/601,235 entitled "Timeline Interface for Video Content" filed Aug. 31, 2012.

U.S. Appl. No. 13/601,210 entitled "Providing Extrinsic Data for Video Content" filed Aug. 31, 2012.

U.S. Appl. No. 13/927,970 entitled "Providing Soundtrack Information During Playback of Video Content" filed Jun. 26, 2013.

U.S. Appl. No. 13/709,768 entitled "Providing Content via Multiple Display Devices" filed Dec. 10, 2012.

U.S. Appl. No. 13/778,846 entitled "Shopping Experience Using Multiple Computing Devices" filed Feb. 27, 2013.

International Searching Authority and Written Opinion dated Mar. 21, 2014 for PCT/US2013/057543 filed Aug. 30, 2013.

"Sony Pictures to smarten up Blu-ray with MovieiQ, the 'killer app for BD-Live,'" Engadget, retrieved from http://www.engadget.com/2009/06/18/sony-pictures-to-smarten-up-blu-ray-with-movieiq-the-killer-ap/, Jun. 18, 2009.

"Hulu 'Face Match' feature attaches an actor's entire history to their mug," Engadget, retrieved from http://www.engadget.com/20 11/12/08/hulu-face-match-feature-attaches-an-actors-entire-h istory-to/, Dec. 8, 2011.

"TVPius for the iPad," iTunes Store, retrieved from "http://itunes.apple.com/us/app/tvplus/id444774882?mt=B," updated Apr. 13, 2012.

"Wii U GamePad," Wii U Official Site—Features, retrieved from "http://www.nintendo.com/wiiu/features/," retrieved Dec. 4, 2012.

"Entertainment is more amazing with Xbox SmartGiass," Xbox SmartGiass 1 Companion Application—Xbox.com, retrieved from "http://www.xbox.com/en-US/smartglass," retrieved Dec. 4, 2012.

U.S. Appl. No. 15/792,217, filed Oct. 24, 2017, Final Office Action dated Sep. 28, 2018.

U.S. Appl. No. 14/493,970, filed Sep. 23, 2014, Non-Final Office Action dated Sep. 21, 2018.

U.S. Appl. No. 15/665,668, filed Aug. 1, 2017, Non-Final Office Action dated Sep. 7, 2018.

U.S. Appl. No. 15/164,070, filed May 25, 2016, Final Office Action dated Aug. 16, 2018.

U.S. Appl. No. 13/927,970, filed Jun. 26, 2013, Non-Final Office Action dated Oct. 5, 2018.

\* cited by examiner

PLAYBACK OF CONTENT USING MULTIPLE DEVICES

BACKGROUND

Various video-on-demand services are available for users to stream video content to their digital televisions, set-top boxes, tablets, smartphones, and/or other devices. If a user has to move from one device to another during the playback of the video content, the user typically will stop the video content on the first device. The user moves to the second device and starts playback of the video content again. The user may use a seek or fast forward control to manually cue the playback on the second device to the approximate point where playback on the first device left off.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to playback of content using multiple devices. For various reasons, it may be desired to stop playback of content on one device and to resume the playback on another device. For example, a person may be watching a movie on a large television in a living room and may have to yield access to the television to others. The person may wish to transfer playback to a television in a different room. Typically, this involves the person attempting to remember where the playback stopped, commencing playback in the different room, and then fast-forwarding to approximately the position in the movie where playback left off. Such a procedure may be a hassle, and it may be difficult to locate where the playback should resume.

Various embodiments of the present disclosure facilitate transferring playback from one device to another. In some scenarios, content playback among multiple devices may be synchronized. In various embodiments, one device may serve as a companion to a primary device upon which the content is being rendered. The companion device may be used to control the primary device and/or to present additional or complementary information regarding the content being shown by the primary device.

Figure 1A:
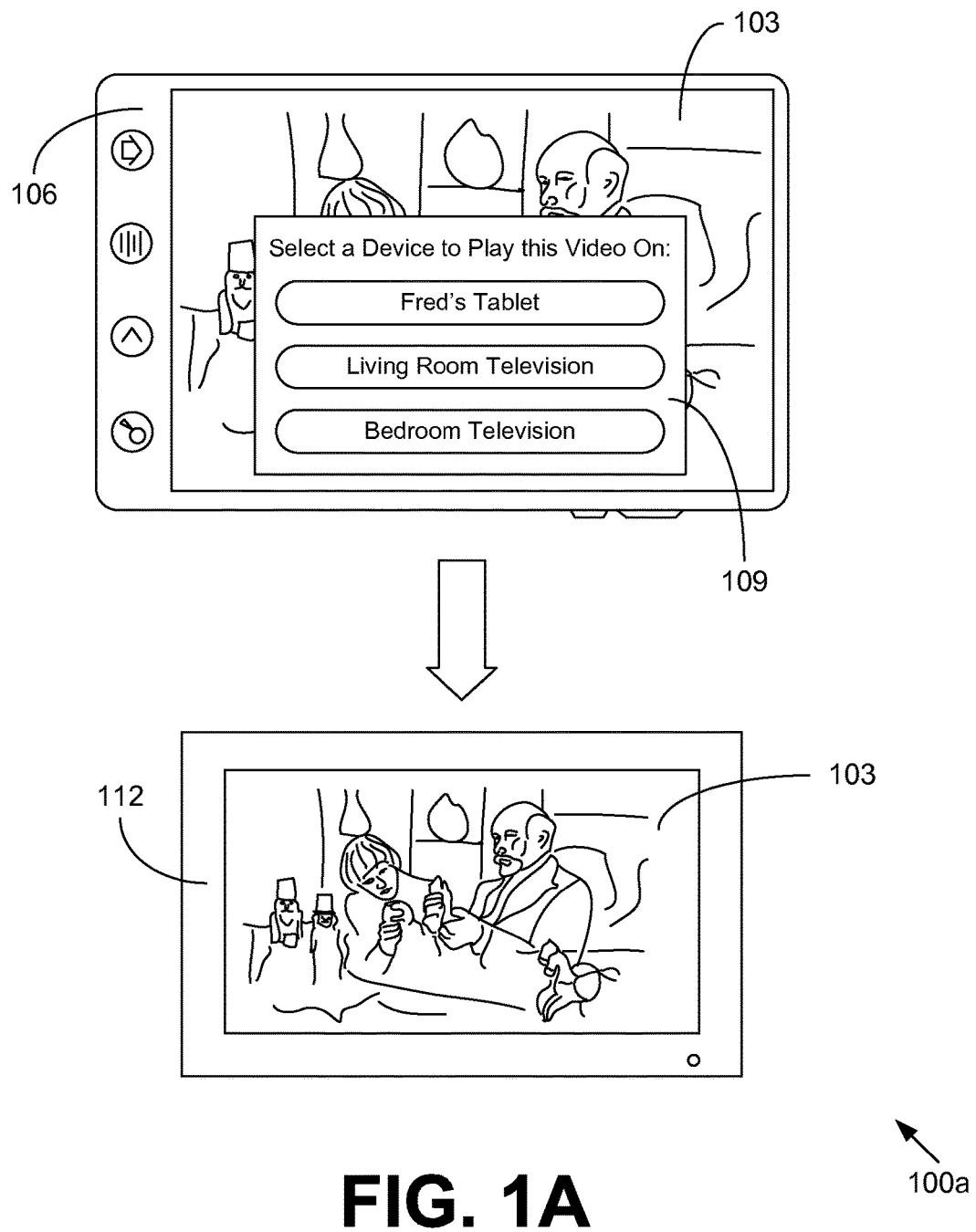
FIGS. 1A and 1B are drawings that illustrate example scenarios involving transfer of video playback from one device to another according to various embodiments of the present disclosure.

With reference to FIG. 1A, shown is an example scenario 100a involving transfer of video playback from one device to another according to an embodiment of the present disclosure. In the example scenario, a user is playing a video content feature 103 upon a mobile device 106. The user may wish to transfer playback of the video content feature 103 to another device. To this end, the user may enter a gesture or select a button, icon, or other user interface component, and the user interface 109 may be rendered. The user interface 109 facilitates selection of a target device from a listing. Here, the available devices are "Fred's Tablet," "Living Room Television," and "Bedroom Television."

In this non-limiting example, suppose that the user selects "Living Room Television" from the listing in the user interface 109. Consequently, playback of the video content feature 103 may commence upon a television device 112 corresponding to the "Living Room Television." The playback of the video content feature 103 upon the television device 112 may be synchronized to the playback of the video content feature 103 upon the mobile device 106. Subsequently, the playback may continue or be stopped upon the mobile device 106. In some cases, the mobile device 106 may enter a companion mode whereby auxiliary content is shown upon the mobile device 106 in synchronization with the playback of the video content feature 103 upon the television device 112. Further, the mobile device 106 may be configured to render various user interface components facilitating control of the playback upon the television device 112, sharing information regarding the playback or auxiliary content with a social network, and/or to perform other functions.

Figure 1B:
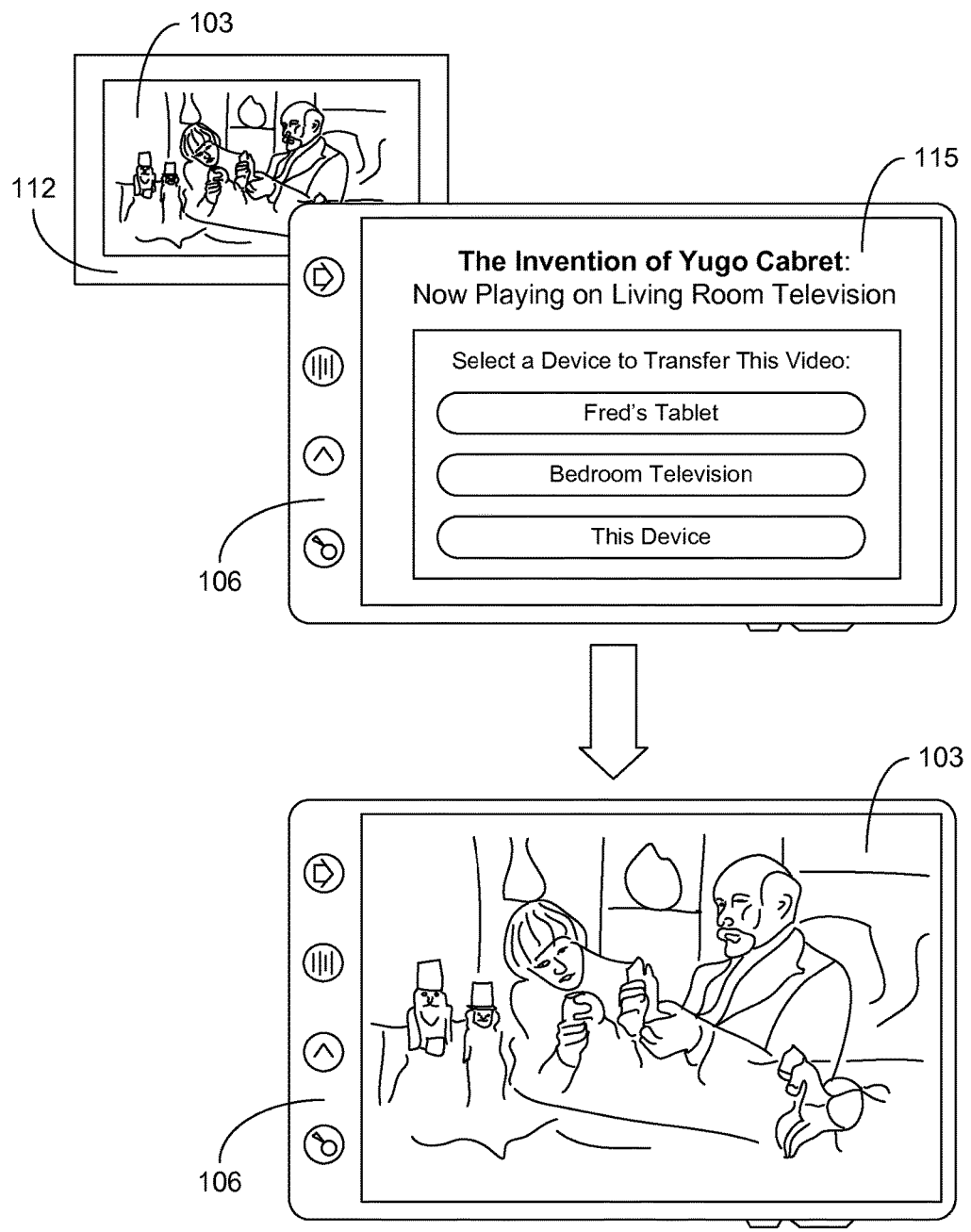

With reference to FIG. 1B, shown is another example scenario 100b involving transfer of video playback from one device to another according to an embodiment of the present disclosure. In the example scenario, a user is playing a video content feature 103 upon a television device 112. The user (or another user) has a mobile device 106 that renders an auxiliary content user interface 115. In this example, the auxiliary content user interface 115 indicates that the movie "The Invention of Yugo Cabret" is currently playing on the "Living Room Television." The auxiliary content user interface 115 may present additional information about the video content feature 103 (e.g., cast members in a current scene, quotes and trivia related to the current scene, a currently playing sound track, and/or other information). The auxiliary content user interface 115 may also facilitate control of the playback of the video content feature 103 upon the television device 112.

In this non-limiting example, the auxiliary content user interface 115 includes components that facilitate transfer of playback of the video content feature 103 to another device. Choices given include "Fred's Tablet," "Bedroom Television," and "This Device." In this example, the user selects "This Device," thus as shown in FIG. 1B, the playback of the video content feature 103 is transferred to the mobile device 106. The playback may immediately begin upon the mobile device 106 in synchronization with the playback upon the television device 112. Although such a transfer may result in stopping playback on the television device 112 in some examples, the playback upon the television device 112 may continue in other examples. In the following discussion, a general description of the system and its components is provided, followed by a discussion of the operation of the same.

Figure 2:
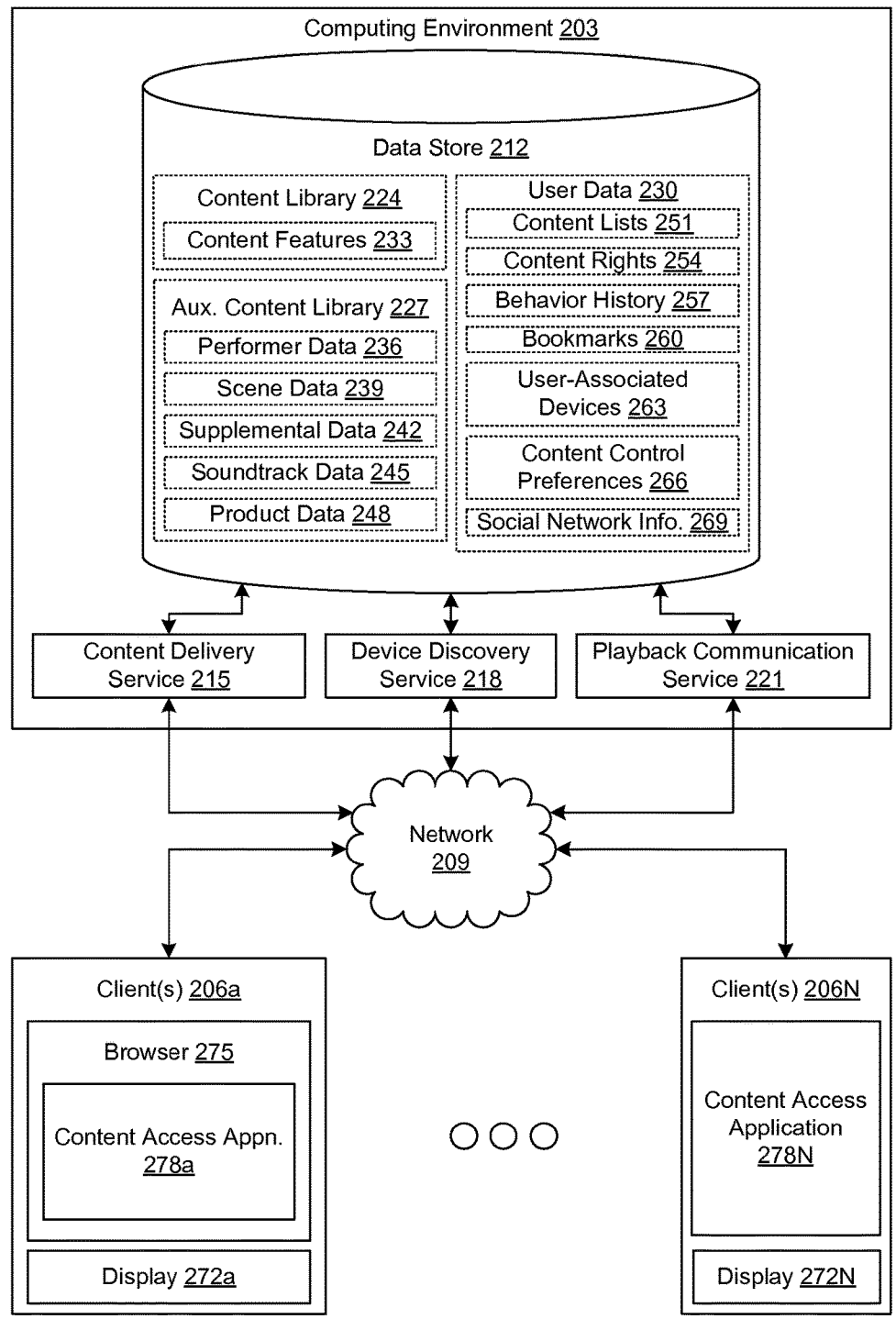
FIG. 2 is a schematic block diagram of a networked environment according to various embodiments of the present disclosure.

With reference to FIG. 2, shown is a networked environment 200 according to various embodiments. The networked environment 200 includes a computing environment 203 and a plurality of clients 206a . . . 206N, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks. In one embodiment, the clients 206 are coupled to different network segments, such that broadcast messages are not routed between the different network segments.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery service 215, a device discovery service 218, a playback communication service 221, and other applications, services, processes, systems, engines, or functionality not discussed in detail herein. The content delivery service 215 is executed to serve up or stream content features to clients 206. The content delivery service 215 may be configured to send extrinsic data, or auxiliary content, to the clients 206 to accompany the content feature. The device discovery service 218 is executed to discover potential target clients 206 for which a user may initiate playback of a content feature or to which a user may transfer playback of a currently playing content feature. The playback communication service 221 is executed to facilitate communication among clients 206 for which a user account is permitted to control playback. For example, the playback communication service 221 may forward playback commands from one client 206 to another and may also forward status updates from one client 206 to another.

The data stored in the data store 212 includes, for example, a content library 224, an auxiliary content library 227, user data 230, and potentially other data. The content library 224 may include multiple content features 233 such as movies, television shows, video clips, audio programs, image slideshows, and/or other forms of content. Although some content features 233 may be described as "video content," it is understood that such video content features 233 may include accompanying audio, closed captioning text, and/or other data. It is noted that the content library 224 may be absent in some embodiments as the computing environment 203 may coordinate playback of content features 233 and/or send auxiliary content but not actually send or stream the content features 233.

The auxiliary content library 227 includes various auxiliary content items that are associated with the content features 233. Non-limiting examples of the auxiliary content items may include names or descriptions of performers in the content features 233, biographies or filmographies of the performers, commentary, trivia, mistakes, user comments, images, descriptions of products available for ordering, supplemental video content, and/or other data. The auxiliary content library 227 may include curated data that is professionally managed, verified, or is otherwise trustworthy.

For example, the auxiliary content library 227 may include performer data 236, scene data 239, supplemental data 242, soundtrack data 245, product data 248, and/or other data. The performer data 236 includes the name, character information, images, and/or other data describing performers in a content feature 233. The term "performer" may in some cases encompass additional participants in a content feature 233, such as, for example, crew members. The images may correspond to generic images not taken from the content feature 233 and/or character images captured from or defined as a portion of a video frame of the content feature 233.

The scene data 239 divides a content feature 233 into multiple scenes. A scene corresponds to a period of time in the content feature 233 having multiple frames, and may be determined as having a distinct plot element or setting. The content feature 233 may identify the cast members or characters who perform in a given scene. In some cases, the scene data 239 may record the times when the cast members or characters first appear in the scene, last appear in the scene, or are on-screen. In some embodiments, the times may be represented as a frame number, or a range of frame numbers, in the content feature 233. The scene data 239 may also include positional or location information as to where cast members and/or products appear within a frame on screen. The supplemental data 242 may include various quotations from characters in the content feature 233 and may be correlated with times of appearance in the content feature 233 and/or scenes of appearance in the content feature 233. The supplemental data 242 may also include data relating to trivia, goofs, user-generated comments, external content, outbound hyperlinks, outtakes, behind-the-scenes content, commentary content, applications, games, photo galleries, and so on, which may be correlated to particular times or scenes within the content feature 233.

The soundtrack data 245 may include various information about the audio of the content feature 233. For example, the soundtrack data 245 may identify that a particular audio track is being used at a certain time in the content feature 233 or during a certain scene of the content feature 233. In addition, the soundtrack data 245 may identify performers who vocally perform characters in the audio. Such performers may be considered cast members. However, such performers may differ from cast members who visually perform the same characters in some cases. One such case is where a song is recorded by a vocalist and a different performer merely lip-syncs to the recorded song in the video of the content feature 233.

The product data 248 may identify associations of products with times or scenes in content features 233. The products may correspond to any item offered for purchase, download, rental, or other form of consumption. For example, a particular brand of potato chips may be shown and/or mentioned in dialogue of a movie. The product data 248 may be used to promote products that are related to various scenes in the content features 233 at the appropriate times. Such promotions may be rendered relative to a position of the product within a frame of the content feature 233. Such products may also include books, electronic books, soundtrack albums, applications, etc. that are relevant to the content feature 233. For example, the content feature 233 may be an adaptation of a book, or an album might correspond to the soundtrack of the content feature 233.

The user data 230 includes various data about users of the content delivery service 215. The user data 230 may include content lists 251, content rights 254, behavior history 257, bookmarks 260, user-associated devices 263, content control preferences 266, social network information 269, and/or other data. The content lists 251 may correspond to watch lists, wish lists, shopping lists, "favorites" lists, and/or other user-managed lists of content features 233. The content rights 254 describe to which content in the content library 224 a user has access. For example, a user may have rented or purchased a particular content feature 233. In some cases, a user may have a subscription that provides access to all or some of the content features 233. Such a subscription may be limited in some way (e.g., number of titles, number of bytes, quality level, time of day, etc.) or unlimited. The content rights 254 may indicate a maximum number of clients 206 for simultaneous playback of content features 233.

The behavior history 257 may include various data describing behavior or preferences of a user. Such data may include a purchase history, a browsing history, a view history, explicitly configured viewing preferences, and/or other data. The bookmarks 260 correspond to specific times or scenes in a content feature 233 that the user has indicated to be interesting and worthy of returning to in the future.

The user-associated devices 263 correspond to those clients 206 which are associated with the specific user. The user-associated devices 263 may be owned by or registered to the user. If a user-associated device 263 is not owned by or registered to the user, the user may otherwise have access to initiate playback of content features 233 or perform other operations upon the user-associated device 263. The user-associated devices 263 may include devices that are active (i.e., ready to render content features 233 or auxiliary content) or inactive (e.g., registered to the user but turned off). The user-associated devices 263 may include a variety of devices, including, for example, tablets, smartphones, electronic book readers, set-top boxes, gaming consoles, televisions, and/or other devices. Individual user-associated devices 263 may be associated with a corresponding geographic location ascertained by a global positioning system (GPS) device, triangulation of signal strength, network address geolocation, or other location services.

The content control preferences 266 may define which users or clients 206 are permitted to commence or otherwise control playback on user-associated devices 263. For example, a user may grant a friend permission to synchronize content playback on the friend's client 206 with content playback on the user's client 206. Such permission may be valid until withdrawn or may be time-limited. The social network information 269 may include account information for the user relative to one or more social networks. When a user has provided social network information 269, the computing environment 203 may interact with one or more social networks to share events relating to the user's playback of content features 233.

The clients 206a . . . 206N are representative of a plurality of client devices that may be coupled to the network 209. Each client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The clients 206 may include a respective display 272a . . . 272N. The displays 272 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

Each client 206 may be configured to execute various applications such as a browser 275, a respective one of a plurality of content access applications 278a . . . 278N, and/or other applications. The browser 275 may be executed in a client 206, for example, to access network content served up by the computing environment 203 and/or other servers, thereby rendering a user interface on the display 272a. The content access application 278 is executed to obtain content features 233 from the content delivery service 215 and to render the content features 233 on the display 272a. Additionally, the content access application 278 may be configured to obtain auxiliary content from the content delivery service 215 and to render a user interface based at least in part on the auxiliary content to enhance the user experience in viewing and/or listening to the content feature 233.

In some cases, the content feature 233 may be rendered on a different display 272 (of the same or different client 206) from the user interface. In one embodiment, the content access application 278a may be a plug-in of the browser 275 or otherwise executed in the environment of the browser 275. The clients 206 may be configured to execute other applications such as, for example, mobile applications, email applications, social networking applications, etc.

Next, a general description of the operation of the various components of the networked environment 200 is provided. To begin, a user opens a content access application 278 upon a client 206, which may be implemented as a standalone application or within a browser 275. The user may browse a catalog of titles from the content library 224. The user may then select a content feature 233 to be presented. The user may choose to play the content feature 233 on the same client 206 or to initiate playback on one or more other clients 206. Where the content feature 233 is played on multiple clients 206, the playback may be synchronized.

In addition, the user may choose to display auxiliary content related to the content feature 233 upon one or more clients 206. The auxiliary content may be synchronized to the playback of the content feature 233 and/or may be responsive to user interaction (e.g., a user requesting biographical information regarding a cast member). In some cases, the client 206 presenting the auxiliary content may be presenting a game with questions or tasks synchronized with the content features 233. For example, a content feature 233 may correspond to a television game show, and the auxiliary content may enable the user to respond to the questions asked on the game show. Further, the user may create supplemental content via the client 206 that presents the auxiliary content. For example, the user may type or record commentaries and then share them with users at other clients 206, potentially via a social network.

During the playback of the content feature 233, the user may initiate various commands from the client 206 playing back the content feature 233 or via another client 206 rendering the auxiliary content. The user may request that the playback be transferred from one client 206 to another. Further, the user may request that the auxiliary content user interface be transferred from one client 206 to another.

The user-associated devices 263 that are potential targets for playing back the content feature 233 or for rendering auxiliary content are identified by the device discovery service 218. The device discovery service 218 may determine which clients 206 that are associated with the user are active. To this end, a client 206 may report to the device discovery service 218 the existence of other clients 206 that are reachable via the network 209 as determined via broadcast discovery messages or other approaches. In one embodiment, a user may use one client 206 to "discover" another client 206 by capturing a QR code or other code rendered on a display 272 of the other client 206, recognizing audio emitted by the other client 206, scanning a near-field communication tag on or embedded in the other client 206, or using other approaches.

Inactive clients 206 may be potential targets, with the action deferred until the inactive clients 206 become active. In other cases, the device discovery service 218 may identify those clients 206 that are near one another based upon locations of the respective clients 206. In one embodiment, a friendship on a social network may facilitate an association among clients 206 of different users. Alternatively, a user may be able to search for clients 206 associated with another user based upon name and/or other criteria. Permissions in the content control preferences 266 may grant or deny access for playback instructions and other commands from other users.

The playback communication service 221 facilitates communication among the clients 206. For example, the playback communication service 221 may forward playback requests and status updates between clients 206. The exchange of timing information enables synchronization of playback and auxiliary content among multiple clients 206. The exchange of instructions enables remote control of one client 206 by another client 206. In one embodiment, a low-level transmission control protocol (TCP) application programming interface (API) is employed for communication between the content access applications 278 and the playback communication service 221. One example of such an API may use the WebSocket protocol. In other embodiments, hypertext transfer protocol (HTTP), simple object access protocol (SOAP), representational state transfer (REST), real-time transfer protocol (RTP), user datagram protocol (UDP), and/or other protocols may be employed.

In some embodiments, the playback communication service 221 may facilitate direct communication among clients 206. For example, when the clients 206 are on the same local network 209, following discovery facilitated by the playback communication service 221, the clients 206 may communicate directly on the local network 209 to send playback instructions, status updates, etc. To this end, there may be a determination made as to whether two clients 206 are capable of direct communication, and if they are not, centrally routing the communication via the playback communication service 221.

Various use cases of the present disclosure involve synchronization of playback among multiple clients 206. For example, playback of a particular movie may be synchronized for clients 206 in multiple rooms in a building, or for clients 206 separated by a large geographic distance. Such synchronized playback may facilitate a social discussion via telephone call, text message, social network, or other communications medium. In addition, one client 206 may render visuals for a content feature 206, while another client 206 may render audio for the content feature 206. Such a feature may be useful when the audio for the client 206 having the primary display 272 has to be turned off (e.g., a person may listen to the audio via a smartphone without others in the room being disturbed). Further, commentaries, alternative languages, or other separate audio programs may be played out on a client 206 in synchronization with visuals presented by another client 206.

It is noted that transferring the playback of content features 233 from one client 206 to another may involve verifying that the destination client 206 is associated with the necessary content rights 254. The content delivery service 215 and/or the content access application 278 may be configured to enforce digital rights management (DRM) restrictions. In one scenario, the source client 206 may lend a license or content right 254 to the destination client 206 that does not otherwise have the content right 254. When lending such a license, the source client 206 may temporarily give up the ability to playback the content feature 206. The source client 206 may retain the ability to present synchronized auxiliary content. It may be the case that a user may temporarily transfer content rights 254 to other users. Alternatively, the user may temporarily transfer content rights 254 from one user-associated device 263 to another. In some situations, the transfer of content rights 254 may be of an indefinite duration.

Various techniques relating to extrinsic data and content features are described in U.S. patent application Ser. No. 13/227,097 entitled "SYNCHRONIZING VIDEO CONTENT WITH EXTRINSIC DATA" and filed on Sep. 7, 2011; U.S. patent application Ser. No. 13/601,267 entitled "ENHANCING VIDEO CONTENT WITH EXTRINSIC DATA" and filed on Aug. 31, 2012; U.S. patent application Ser. No. 13/601,235 entitled "TIMELINE INTERFACE FOR VIDEO CONTENT" and filed on Aug. 31, 2012; U.S. patent application Ser. No. 13/601,210 entitled "PROVIDING EXTRINSIC DATA FOR VIDEO CONTENT" and filed on Aug. 31, 2012; U.S. patent application Ser. No. 13/927,970 entitled "PROVIDING SOUNDTRACK INFORMATION DURING PLAYBACK OF VIDEO CONTENT" and filed on Jun. 26, 2013; all of which are incorporated herein by reference in their entirety.

Additionally, various techniques relating to using multiple display devices are described in U.S. patent application Ser. No. 13/709,768 entitled "PROVIDING CONTENT VIA MULTIPLE DISPLAY DEVICES" and filed on Dec. 10, 2012; U.S. patent application Ser. No. 13/778,846 entitled "SHOPPING EXPERIENCE USING MULTIPLE COMPUTING DEVICES" and filed on Feb. 27, 2013; all of which are incorporated herein by reference in their entirety.

Figure 3A:
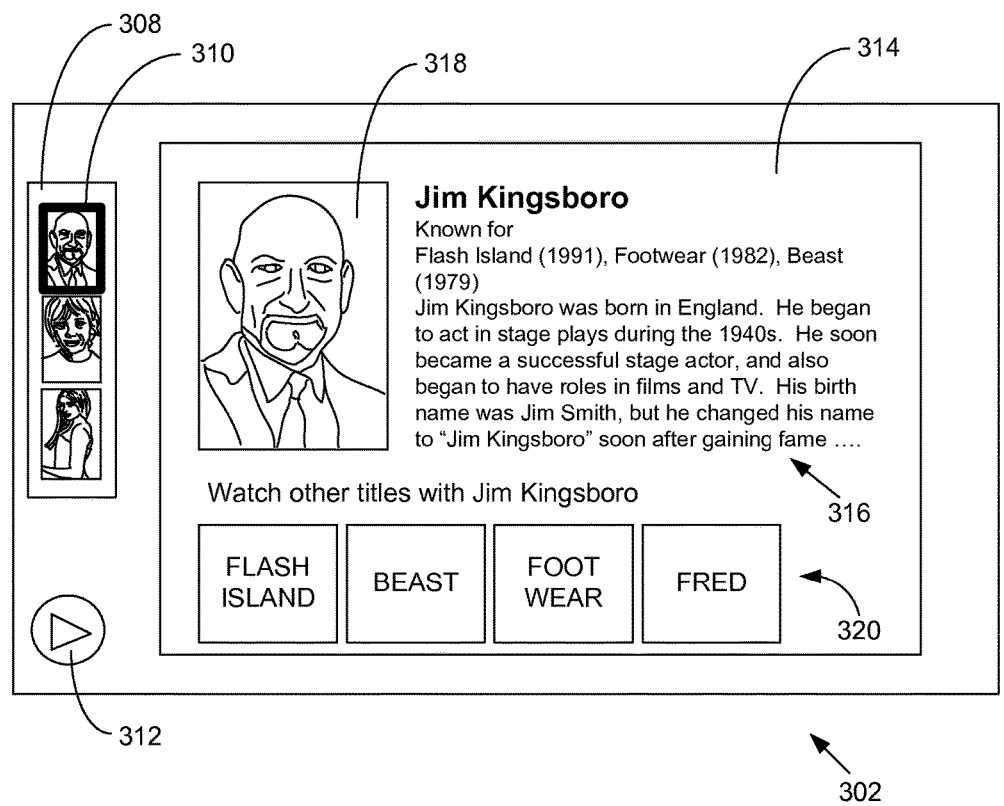
FIGS. 3A-3E are pictorial diagrams of example user interfaces rendered by a client in the networked environment of FIG. 2 according to various embodiments of the present disclosure.

Continuing now to FIG. 3A, shown is an example of a user interface 302 rendered on the display 272 (FIG. 2) of a client 206 (FIG. 2) in the networked environment 200 (FIG. 2) according to various embodiments. The user interface 302 presents auxiliary content in connection with a content feature 233 (FIG. 2) being played back on another client 206. In this non-limiting example, in the cast member selection component 308 that presents cast members in a current scene or frame in the content feature 233, the user has selected the cast member component 310. In this non-limiting example, the cast member selection component 308 omits cast member name and character name to provide a more concise presentation. A play control 312 is rendered, indicating that a content feature 233 playing on a synchronized client 206 has been paused and play may be resumed.

In response to the user selecting the cast member component 310, a detail interface 314 has been rendered. The detail interface 314 provides additional information regarding the selected cast member, who here is "Jim Kingsboro." Specifically, the detail interface 314 may provide biographical information 316, a larger image 318, additional images, and so on. Additional information may be made visible by scrolling a viewport. In addition, the detail interface 314 may provide related content feature selection components 320. Such related content feature selection components 320 may correspond to promotional images of content features 233, text labels for content features 233, and so on, where the content features 233 are somehow related to the selected cast member. For example, the selected cast member may perform, direct, produce, etc. the related content features 233.

The related content feature selection components 320 may be included based at least in part on the behavior history 257 (FIG. 2), content rights 254 (FIG. 2), content lists 251 (FIG. 2), and/or other data associated with the user. For example, certain of the content features 233 which are more likely to be of interest to the user may be presented first. Additional related content feature selection components 320 may be made visible through scrolling a viewport. When a user selects one of the related content feature selection components 320, the user may be presented with further detailed information about the selected content feature 233. Alternatively, or additionally, the user may add the selected content feature 233 to a watch list or other list in the content lists 251 and/or acquire content rights 254 to view the selected content feature 233.

Figure 3B:
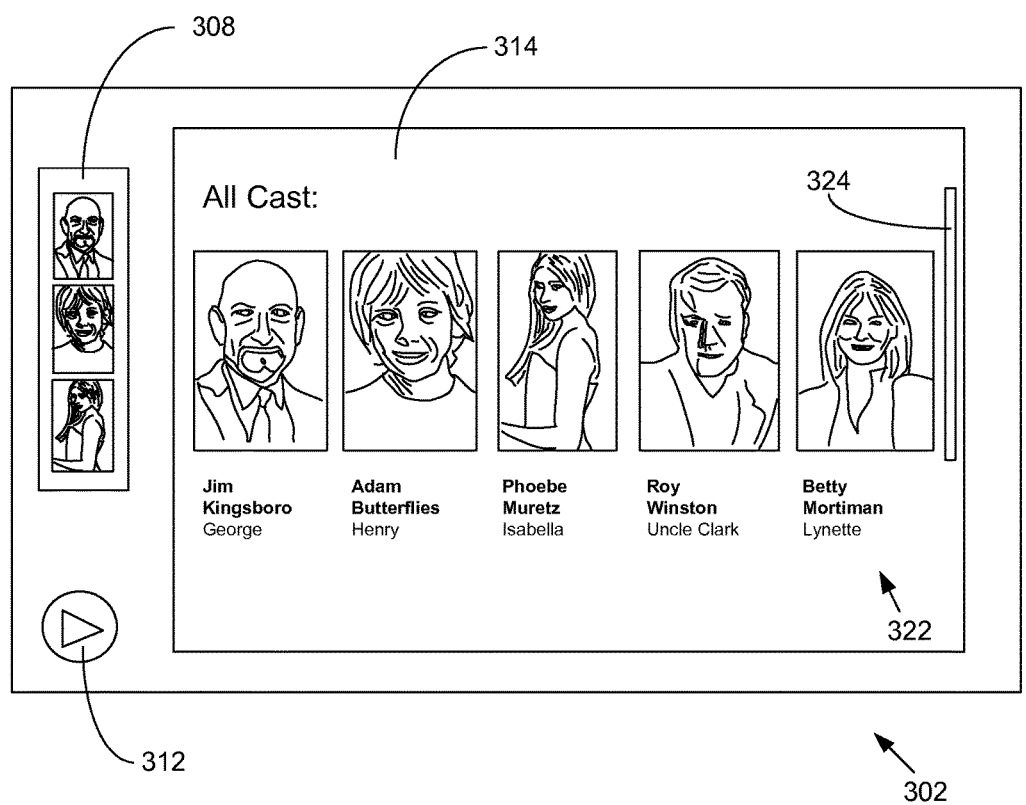

Referring next to FIG. 3B, shown is another example of a user interface 302 rendered on the display 272 (FIG. 2) of a client 206 (FIG. 2) in the networked environment 200 (FIG. 2) according to various embodiments. In this non-limiting example, the detail interface 314 has been updated to show selectable cast member components 322 for all of the cast members in the content feature 233 (FIG. 2). In this non-limiting example, an image, name, and character name is shown for each of the cast members. Selecting a selectable cast member component 322 may cause the detail interface 314 to be updated with additional information about the corresponding selected cast member as in FIG. 3A. A scroll bar 324 or other indication may inform the user that the viewport may be scrolled to make visible additional selectable cast member components 322 for other cast members.

Figure 3C:
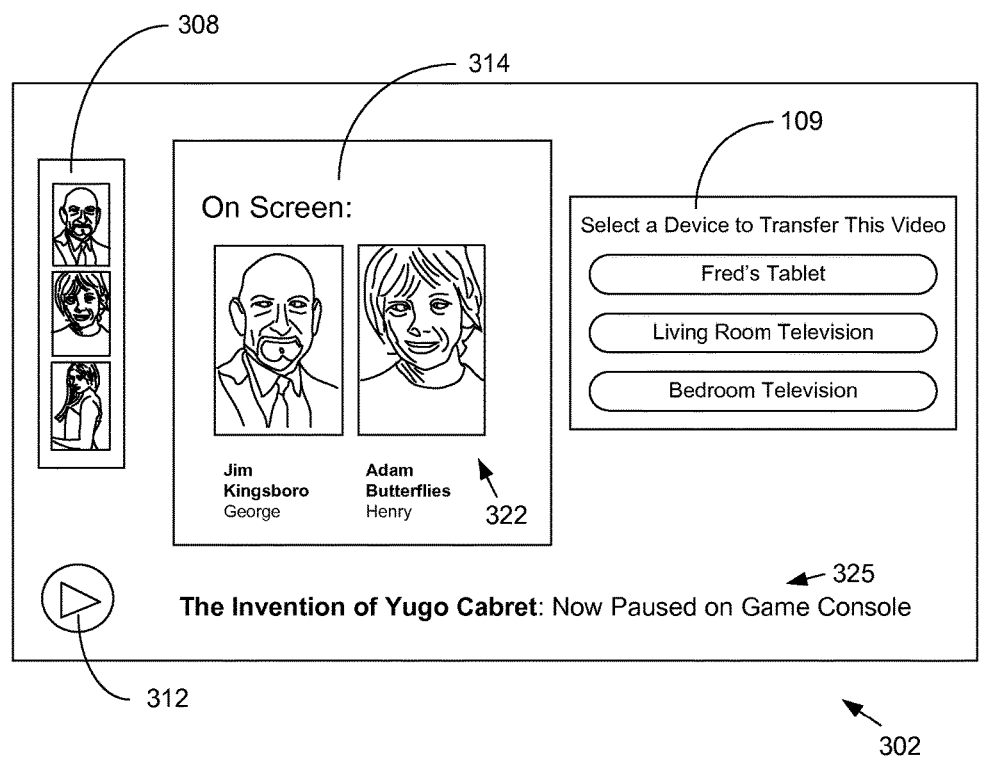

Moving to FIG. 3C, shown is another example of a user interface 302 rendered on the display 272 (FIG. 2) of a client 206 (FIG. 2) in the networked environment 200 (FIG. 2) according to various embodiments. In this non-limiting example, the detail interface 314 of FIG. 3B has been updated to show selectable cast member components 322 for all of the cast members in the content feature 233 (FIG. 2) who are currently performing in the content feature 233 or performing in a current scene of the content feature 233. These cast members may correspond to a subset of the cast members shown in the detail interface 314 of FIG. 3B.

The user interface 302 also includes a user interface 109 that facilitates transfer of the playback of the content feature 233 to other user-associated devices 263 (FIG. 2). The user interface 109 may include components to facilitate transfer of the playback, transfer of the auxiliary content, commencement of playback, commencement of rendering auxiliary content, remote control of playback on another client 206, and/or other operations.

The user interface 302 may further include status information 325 regarding the status of a playback on other clients 206. In this example, the status information 325 indicates that the content is titled "The Invention of Yugo Cabret" and the playback is current paused on a client 206 titled "Game Console." Current time in the content feature 233 and/or other information may be displayed. The title of the client 206 may be user configured or automatically generated in various embodiments.

Figure 3D:
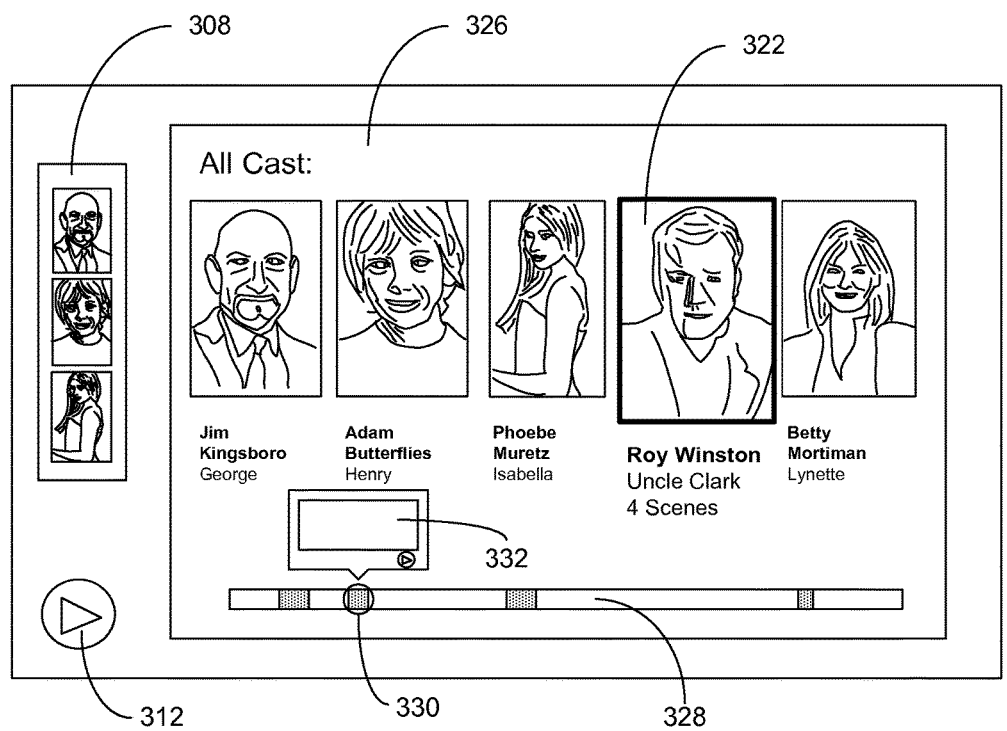

With reference to FIG. 3D, shown is another example of a user interface 302 rendered on the display 272 (FIG. 2) of a client 206 (FIG. 2) in the networked environment 200 (FIG. 2) according to various embodiments. In this non-limiting example, a timeline interface 326 is presented in the user interface 302. The timeline interface 326 features selectable cast member components 322 for all or a subset of the cast members for the content feature 233.

One of the selectable cast member components 322 corresponding to "Roy Winston" is currently selected. The selectable cast member component 322 which is selected indicates the quantity of scenes in the content feature 233 in which the particular cast member appears. In this case, "Roy Winston" appears as the character "Uncle Clark" in four scenes. Where the cast member performs as multiple characters, the quantity information may be provided per character. Alternatively, separate selectable cast member components 322 may be provided for each character.

A timeline component 328 visually represents the video content feature 103 (FIG. 1) and visually segments the content feature 233 into multiple scenes. In this example, the four scenes in which the selected cast member appears are highlighted. Where a subset of the scenes is presented in the timeline component 328, functionality may be provided to play the subset of the scenes sequentially. It is noted that such scenes may be non-contiguous. To this end, the user interface 302 may include a sequential play component, the selection of which launches the sequential play of the subset of the scenes upon the clients 206 that are playing back the content feature 233. The division of the remainder of the timeline component 328 into scenes is absent in FIG. 3D but may be present in other examples. A cursor 330 indicates that one of the scenes is selected for previewing. A preview component 332 may allow the user to see a title for the scene and/or an image for the scene. Further, the preview component 332 may include controls to allow the user to cause playback of the content feature 233 to begin or be cued to the particular scene. In one embodiment, the scene may be previewed as picture-in-picture video within the preview component 332. Additional information such as start time, end time, length, and so on may be provided in some embodiments.

Figure 3E:
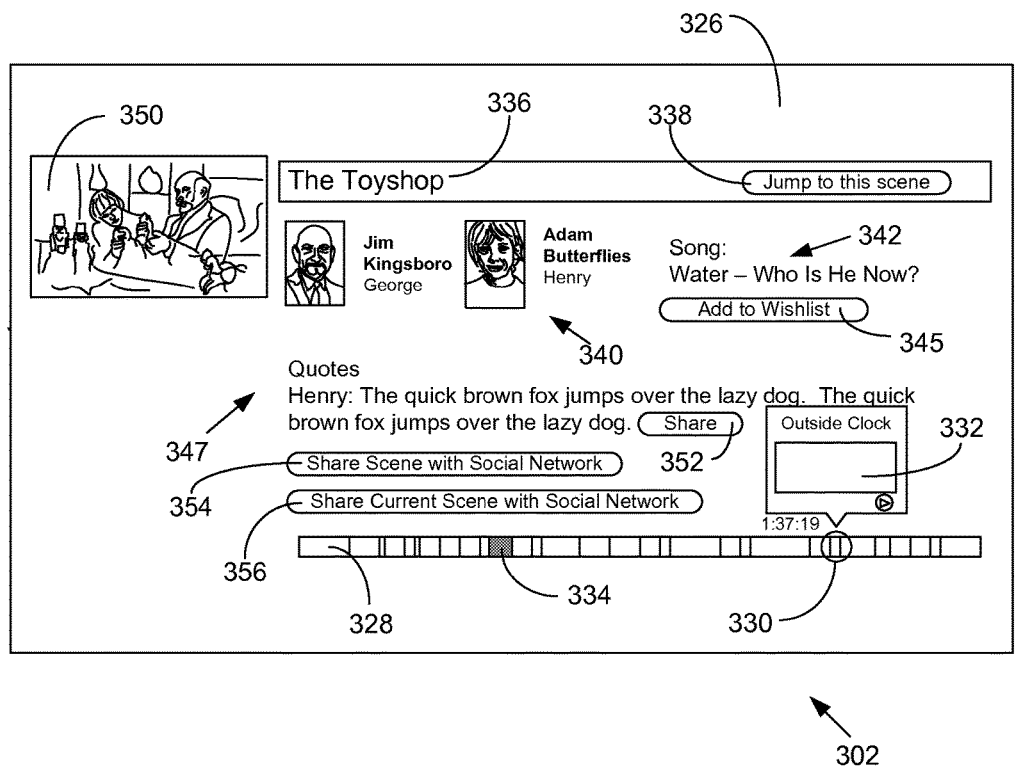

Continuing now to FIG. 3E, shown is another example of a user interface 302 rendered on the display 272 (FIG. 2) of a client 206 (FIG. 2) in the networked environment 200 (FIG. 2) according to various embodiments. A timeline interface 326 is presented in the user interface 302, and the timeline interface 326 provides additional information regarding a scene. The timeline component 328 shows a division or segmentation of the content feature 233 (FIG. 2)

into scenes. In some examples, only a portion of the timeline component 328 is shown and the timeline component 328 may be "zoomed in" or scrolled so that another portion may be shown. It is noted that the scenes are not of equal length in this non-limiting example. The current scene 334 is indicated on the timeline component 328 by way of highlighting.

The timeline interface 326 includes a header 336 identifying a name of the current scene 334. If the current scene 334 in the timeline interface 326 does not correspond to the current scene 334 being played out, a jump component 338 may be presented. The jump component 338, when selected, may cause the content feature 233 to begin playback or be cued for playback at the current scene 334. Cast member indication components 340 identify the cast members who perform in the current scene 334. Where other cast members perform by providing vocals for the current scene 334, the other cast members may be identified similarly.

A current audio track 342 which is featured in the scene may be identified according to the soundtrack data 245 (FIG. 2). An add-to-list component 345 may be provided in order to add the current audio track 342 to a wish list, shopping list, shopping cart, or other list. The add-to-list component 345 may also or instead facilitate an immediate acquisition of the current audio track 342. Where related products have been identified for the current scene 334, promotions for the related products may be provided. Such promotions may include add to list components, acquisition components, creative components, and so on. Quotations 347, trivia, goofs, and/or other information pertinent to the current scene 334 may also be featured in the timeline interface 326. In some cases, components in the user interface 302 may be rendered for the user to provide comments regarding the current scene 334. Such comments may be sent back to the content delivery service 215 (FIG. 2) or otherwise associated with the current scene of the content feature 233. A picture-in-picture interface 350 may be provided to show a representative image or to preview the current scene 334.

In other examples, the timeline component 328 may indicate scenes which have been bookmarked by the user. Further, a user may bookmark a scene using a control in the user interface 302. The bookmark may be reported to the content delivery service 215 (FIG. 2) and recorded in the bookmarks 260 (FIG. 2). Bookmarks 260 may correspond to multiple different bookmark types. For example, a user may indicate a funny scene, a scary scene, a scene with a favorite song, and so on.

Additionally, the timeline component 328 may indicate popular or favorite scenes which have frequently been bookmarked by other users or a group of users. The subset of the scenes may be determined to be popular when they are associated with a bookmark frequency meeting a threshold for a group of users. Subsets of the scenes may be grouped together according to common characteristics, e.g., favorite funny moments, favorite soundtrack song segments, and so on. Such subsets may be editorially classified and/or automatically classified through clustering algorithms and known shared characteristics. Further, such subsets may be determined through types of bookmarks 260. Again, where a subset of the scenes is presented in the timeline component 328, functionality may be provided to play the subset of the scenes sequentially. To this end, the user interface 302 may include a sequential play component, the selection of which launches the sequential play of the subset of the scenes. It is noted that such scenes may be non-contiguous.

The user interface 302 may include various components configured to facilitate sharing information about the playback of the content feature 233 with a social network configured in the social network information 269 (FIG. 2). For example, a share component 352 may enable the quotation 347 to be posted to a social network, a share component 354 may enable an indication of a scene described in the user interface 302 to be shared with a social network, and a share component 356 may enable an indication of the current scene 334 or current position in the content feature 233 to be shared with a social network. Other sharing components may be provided to share other forms of auxiliary content in other examples. Further, components may be provided to invite friends or others on the social network to join in with the current playback experience in some embodiment.

Figure 4:
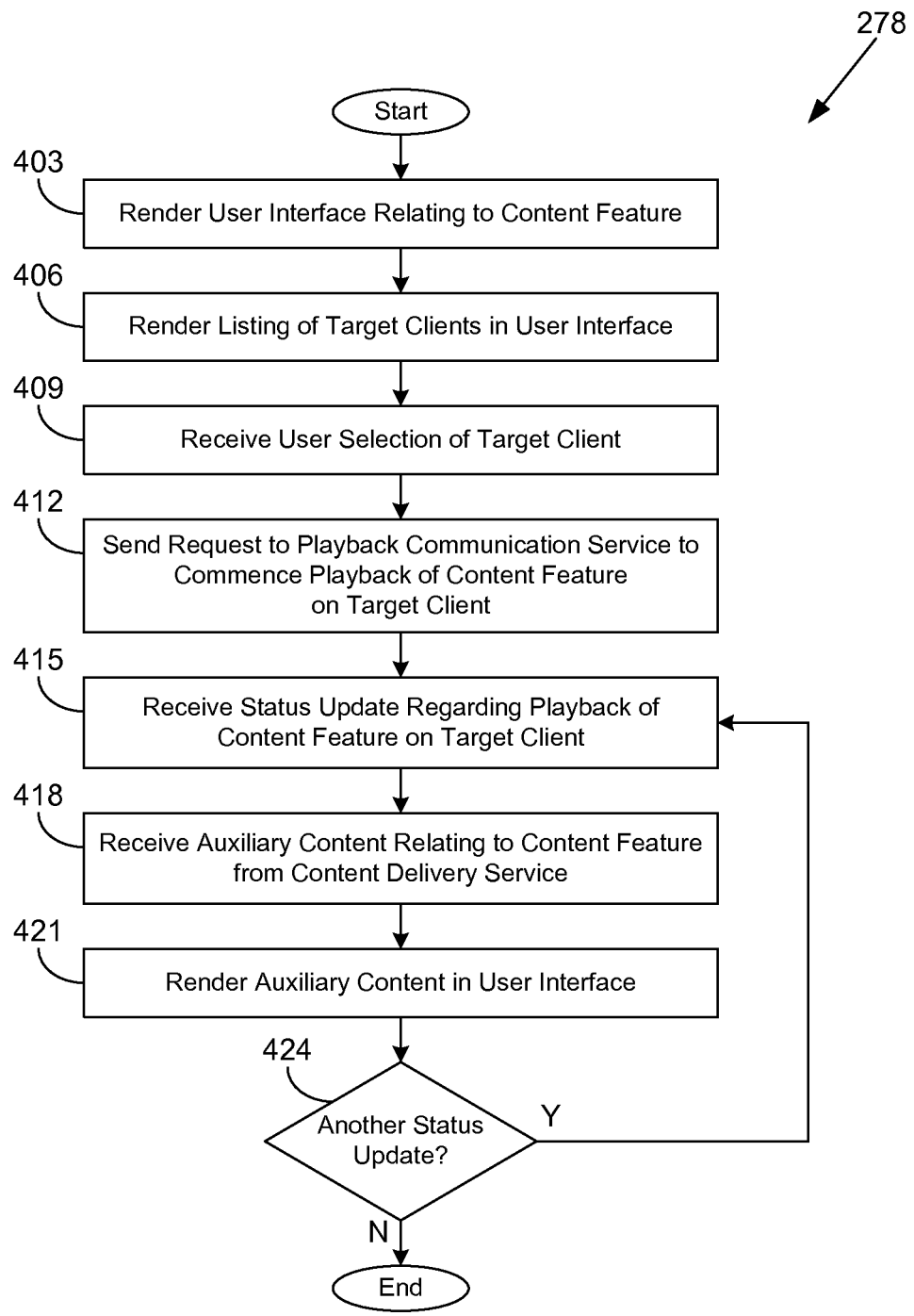
FIGS. 4 and 5 are flowcharts illustrating examples of functionality implemented as portions of a content access application executed in a computing environment in the networked environment of FIG. 2 according to various embodiments of the present disclosure.

Referring next to FIG. 4, shown is a flowchart that provides one example of the operation of a portion of the content access application 278 according to various embodiments. Specifically, the flowchart of FIG. 4 pertains to a content access application 278 in a client 206 (FIG. 2) employed to commence playback upon a target client 206. It is understood that the flowchart of FIG. 4 provides merely an example of the many different types of functional arrangements that may be employed to implement the operation of the portion of the content access application 278 as described herein. As an alternative, the flowchart of FIG. 4 may be viewed as depicting an example of elements of a method implemented in the client 206 according to one or more embodiments.

Beginning with box 403, the content access application 278 renders a user interface relating to a content feature 233 (FIG. 2). The user interface may correspond to at least a portion of a network page rendered within a browser 275 (FIG. 2). Alternatively, the user interface may correspond to a mobile application screen. The user interface may include a currently playing instance of the content feature 233 or may simply provide information or auxiliary content related to the content feature 233.

In box 406, the content access application 278 renders a listing of target clients 206 in the user interface. In some embodiments, the set of target clients 206 may be ascertained from configuration data stored upon the client 206 or may be discovered from a local portion of the network 209 (FIG. 2) via logic executed by the client 206. In another embodiment, the set of target clients 206 may be received from the device discovery service 218 (FIG. 2) via the network 209. The set of target clients 206 may be determined based at least in part on a location of the client 206 and/or a location of the respective target client 206. The set of target clients 206 may also be determined based at least in part on whether the client 206 has permission to control playback upon the respective target client 206 as specified, for example, in the content control preferences 266 (FIG. 2).

In box 409, the content access application 278 receives a user selection of a target client 206. For example, the content access application 278 may receive a user selection via a drop-down box, button, icon, link, or other user interface component. In box 412, the content access application 278 sends a request to the playback communication service 221 (FIG. 2) to commence playback of the content feature 233 upon a display 272 (FIG. 2) of the target client 206. The request may specify, for example, the specific content feature 233, a playback start time in the content feature 233, timestamp information to synchronize playback between the client 206 and the target client 206, a specific display 272 of the target client 206 upon which the content feature 233 is to be rendered, and/or other information.

In box 415, the content access application 278 receives a status update from the playback communication service 221 regarding the requested playback upon the display 272 of the target client 206. For example, the status update may confirm that the playback has started. Alternatively, the status update may indicate that the playback request was rejected. Assuming the playback was successfully commenced, the content access application 278 continues to box 418. In box 418, the content access application 278 may receive auxiliary content relating to the content feature 233 from the content delivery service 215 (FIG. 2). Such auxiliary content may be selected from the auxiliary content library 227 (FIG. 2) and may include trivia, biographical information, quotes, scene information, soundtrack information, and/or other auxiliary content.

In box 421, the content access application 278 renders the auxiliary content in the user interface upon the display 272 of the client 206. In various situations, the auxiliary content may be time-coded relative to the content feature 233. Thus, the content access application 278 may be configured to synchronize the rendering of the auxiliary content with the playback of the content feature 233 based at least in part on timing information reported in the status update received in box 415. For example, when a specific scene in a movie is being played out on the target client 206, the corresponding auxiliary content rendered by the client 206 may correspond to trivia related to the specific scene and/or performers appearing in the current scene.

In box 424, the content access application 278 determines whether another status update is to be received. For instance, periodic status updates with current timing information for the playback may be reported to the playback communication service 221 by the target client 206 and relayed to the content access application 278. Such periodic status updates may be employed to ascertain a current position in the content feature 233 associated with the playback. It is noted that playback may be affected by network 209 (FIG. 2) congestion and errors, which may cause further buffering to be performed by the target client 206. In addition, status updates reflecting a change in playback state (e.g., playback paused, playback stopped, fast forward activated, etc.) may be reported. If another status update is to be received, the content access application 278 returns to box 415 and receives the next status update. If another status update is not to be received (e.g., playback has terminated), the portion of the content access application 278 ends.

Although the example flowchart of FIG. 4 pertains to a scenario wherein the client 206 employs a companion mode, it is understood that the principles of the present disclosure may be used to synchronize playback on both the client 206 and the target client 206. For example, the client 206 and the target client 206 may be playing back the same content feature 233 in synchronization. Alternatively, the client 206 may have paused or stopped a playback of the content feature 233, where the playback of the content feature 233 may be resumed by the target client 206 at the point at which it was paused or stopped.

Additionally, although the example flowchart of FIG. 4 discusses one target client 206, it is understood that multiple target clients 206 may be selected, and playback may be synchronized among the multiple target clients 206. In one embodiment, a target client 206 may be selected to provide a companion mode for the playback, wherein the target client 206 is configured to render auxiliary content in synchronization with the playback.

Figure 5:
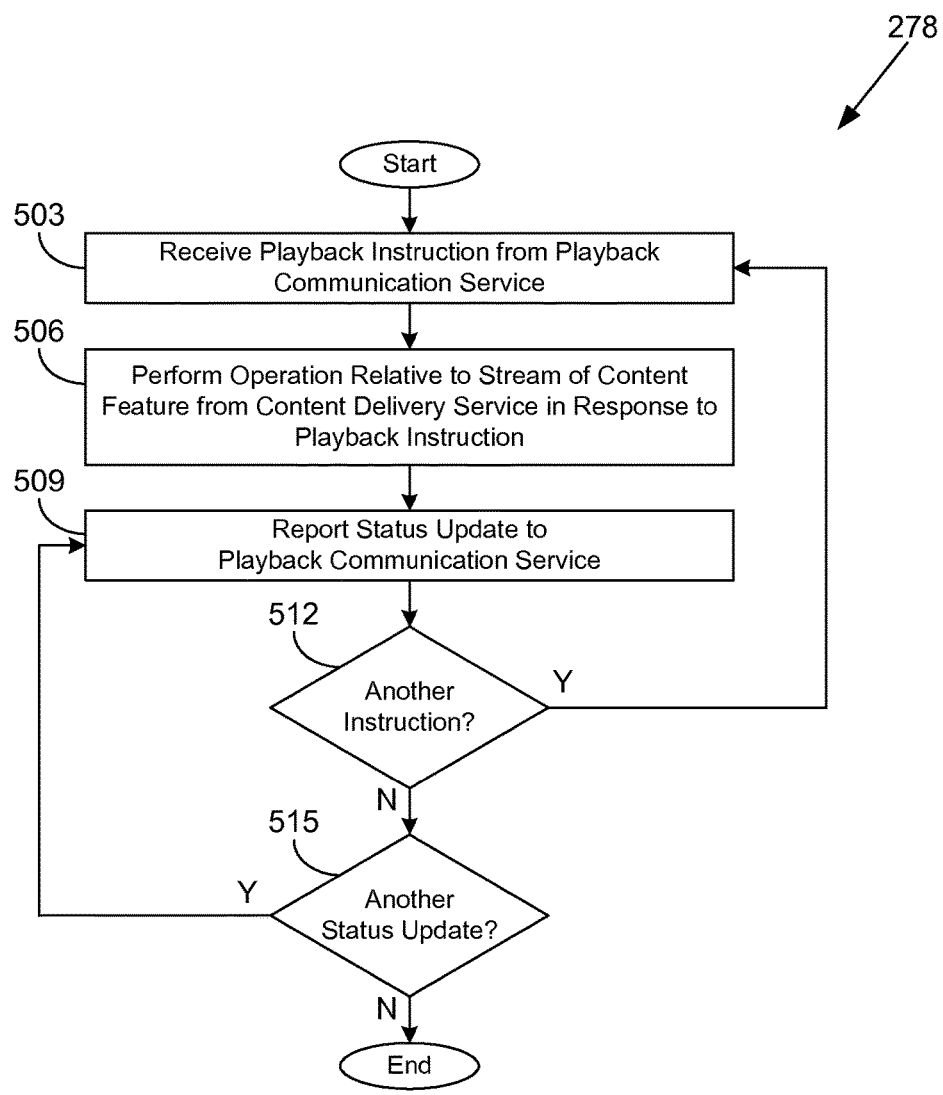

Turning now to FIG. 5, shown is a flowchart that provides one example of the operation of a portion of the content access application 278 according to various embodiments. Specifically, the flowchart of FIG. 5 pertains to a content access application 278 in a client 206 (FIG. 2) that is instructed to commence playback by another client 206. It is understood that the flowchart of FIG. 5 provides merely an example of the many different types of functional arrangements that may be employed to implement the operation of the portion of the content access application 278 as described herein. As an alternative, the flowchart of FIG. 5 may be viewed as depicting an example of elements of a method implemented in the client 206 according to one or more embodiments.

Beginning with box 503, the content access application 278 receives a playback instruction from the playback communication service 221 (FIG. 2). The playback instruction originated from another client 206. The playback instruction may, for example, instruct the content access application 278 to commence playback of an identified content feature 233 (FIG. 2) at the beginning or at a specific starting time within the content feature 233. The instruction may include, for example, an identification of a content feature 233, a specific time for starting playback, synchronization information, identification of another client 206 that originated the instruction, and/or other information.

When the content access application 278 is already playing back the content feature 233, the instruction may request that the playback be stopped or paused, that the playback be cued to a specific seek point, that a trick play mode (e.g., fast forward or rewind) be enabled, and/or other operations relative to the playback of the content feature 233. In one example, the instruction may request that the content access application 278 move from active playback of the content feature 233 to a companion mode for displaying auxiliary content. In one embodiment, the content access application 278 may be configured to verify that the originating client 206 has permission to originate the instruction, e.g., via the content control preferences 266 (FIG. 2).

In box 506, the content access application 278 performs an operation relative to a stream of the content feature 233 from the content delivery service 215 (FIG. 2). For example, where the playback instruction specifies that playback is to be commenced, the content access application 278 requests a new stream of the content feature 233 from the content delivery service 215. Where the playback instruction specifies that playback is to be paused, the content access application 278 may pause a current stream being received from the content delivery service 215. Other operations such as resume, trick play, seek, and so on may be performed in response to playback instructions. In other embodiments, the content feature 233 may be locally stored by the client 206 (e.g., in a digital video recorder, on a Blu-Ray® disc, etc.), and the operation may be performed relative to a local playback subsystem rather than a stream.

In box 509, the content access application 278 reports a status update to the playback communication service 221. The status update may include a current time in the playback of the content feature 233, whether the received instruction was implemented, whether a playback instruction originated by a local user has been implemented (e.g., where a local user at the client 206 pauses the content feature 233, etc.), synchronization information, and/or other status information. In box 512, the content access application 278 determines whether another instruction is received. If another instruction is received, the content access application 278 returns to box 503. Otherwise, the content access application 278 proceeds from box 512 to box 515.

In box 515, the content access application 278 determines whether another status update is to be reported. For example, the content access application 278 may be configured to report status updates periodically during playback and/or in response to events (e.g., playback paused due to rebuffering, playback stopped due to application exit request, etc.). If another status update is to be reported, the content access application 278 returns to box 509. If another status update is not to be reported, the portion of the content access application 278 ends.

Although the flowchart of FIG. 5 discusses a content access application 278 in a role of playing back a content feature 233 in response to an instruction originated by another client 206, it is understood that the user of the content access application 278 may also originate instructions relative to the playback of the content feature 233 or rendering of auxiliary content by other clients 206. For example, the content access application 278 may transfer playback to other clients 206 if desired.

Figure 6:
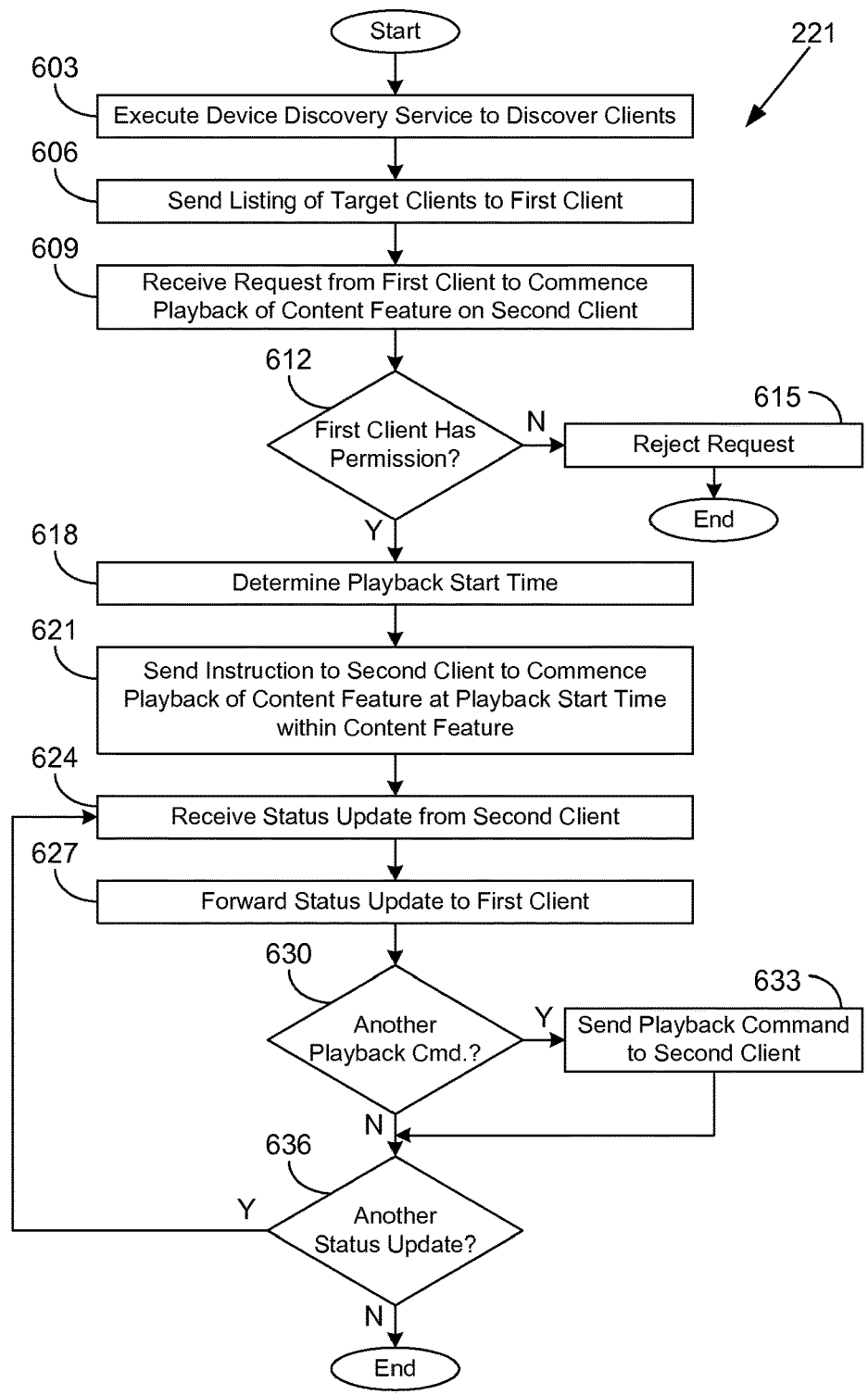
FIG. 6 is a flowchart illustrating one example of functionality implemented as portions of a playback communication service executed in a computing environment in the networked environment of FIG. 2 according to various embodiments of the present disclosure.

Continuing to FIG. 6, shown is a flowchart that provides one example of the operation of a portion of the playback communication service 221 according to various embodiments. It is understood that the flowchart of FIG. 6 provides merely an example of the many different types of functional arrangements that may be employed to implement the operation of the portion of the playback communication service 221 as described herein. As an alternative, the flowchart of FIG. 6 may be viewed as depicting an example of elements of a method implemented in the computing environment 203 (FIG. 2) according to one or more embodiments.

Beginning with box 603, the playback communication service 221 executes the device discovery service 218 (FIG. 2) to discover target clients 206 (FIG. 2). In box 606, the playback communication service 221 sends a listing of target clients 206 to a first client 206 in response to a request from the first client 206. In box 609, the playback communication service 221 receives a request from the first client 206 to commence playback of a content feature 233 (FIG. 2) upon a second client 206 selected from the listing of target clients 206. In box 612, the playback communication service 221 determines whether the first client 206 has permission to send the request according to the content control preferences 266 (FIG. 2) associated with the second client 206. If the first client 206 does not have permission, the playback communication service 221 rejects the request in box 615. Thereafter, the portion of the playback communication service 221 ends.

If the first client 206 does have permission, the playback communication service 221 continues from box 612 to box 618. In box 618, the playback communication service 221 determines a playback start time. For example, the request may specify a specific start time or that the playback is to commence from the beginning. In box 621, the playback communication service 221 sends an instruction to the second client 206 to commence playback of the content feature 233 at the determined playback start time within the content feature 233.

In box 624, the playback communication service 221 receives a status update from the second client 206. In box 627, the playback communication service 221 forwards or relays the status update to the first client 206. In box 630, the playback communication service 221 determines whether another playback command or request is obtained from the first client 206. If another playback command is obtained and the first client 206 has permission to execute the playback command, the playback communication service 221 moves to box 633 and sends the playback command to the second client 206. The playback communication service 221 then proceeds to box 636. If another playback command is not sent, the playback communication service 221 proceeds directly from box 630 to box 636.

In box 636, the playback communication service 221 determines whether another status update is to be received. If another status update is to be received, the playback communication service 221 returns to box 624. If another status update is not to be received, the portion of the playback communication service 221 ends.

Although the flowchart of FIG. 6 describes communication between a first client 206 and a second client 206 facilitated by the playback communication service 221, it is understood that the playback communication service 221 may facilitate communication between the first client 206 and multiple second clients 206. Further, in some examples, any of the second clients 206 may be configured to originate instructions for controlling playback and/or auxiliary content rendering upon the first client 206.

Figure 7:
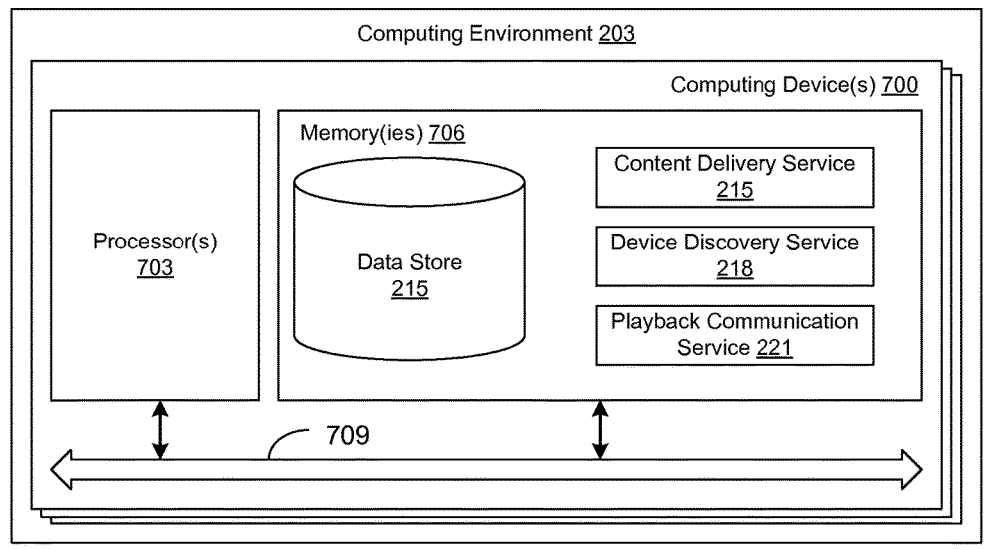
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the content delivery service 215, the device discovery service 218, the playback communication service 221, and potentially other applications. Also stored in the memory 706 may be a data store 212 and other data. In addition, an operating system may be stored in the memory 706 and executable by the processor 703.

Figure 8:
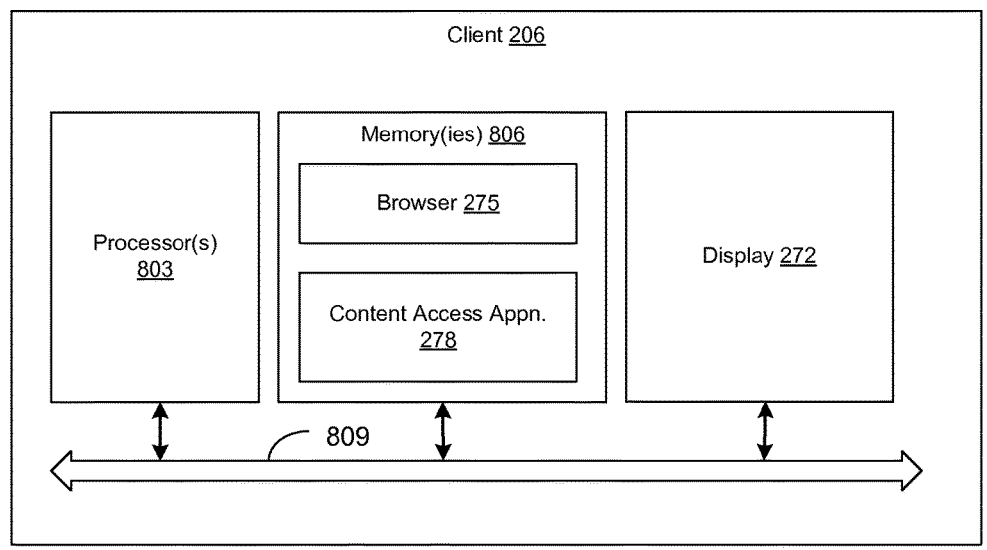
FIG. 8 is a schematic block diagram that provides one example illustration of a client employed in the networked environment of FIG. 2 according to various embodiments of the present disclosure.

With reference to FIG. 8, shown is a schematic block diagram of a representative client 206 according to an embodiment of the present disclosure. The client 206 includes at least one processor circuit, for example, having a processor 803 and a memory 806, both of which are coupled to a local interface 809. To this end, the client 206 may comprise, for example, at least one client computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are a browser 275, a content access application 278, and potentially other applications. In addition, an operating system may be stored in the memory 806 and executable by the processor 803.

Referring now to both FIGS. 7 and 8, it is understood that there may be other applications that are stored in the memories 706, 806 and are executable by the processors 703, 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memories 706, 806 and are executable by the processors 703, 803. In this respect, the term "executable" means a program file that is in a form that can ultimately be run by the processors 703, 803. Examples of executable programs may be, for example, a compiled program that can be translated into machine code in a format that can be loaded into a random access portion of the memories 706, 806 and run by the processors 703, 803, source code that may be expressed in proper format such as object code that is capable of being loaded into a random access portion of the memories 706, 806 and executed by the processors 703, 803, or source code that may be interpreted by another executable program to generate instructions in a random access portion of the memories 706, 806 to be executed by the processors 703, 803, etc. An executable program may be stored in any portion or component of the memories 706, 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 706, 806 are defined herein as including both volatile and nonvolatile memory and data storage components. Volatile components are those that do not retain data values upon loss of power. Nonvolatile components are those that retain data upon a loss of power. Thus, the memories 706, 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 703, 803 may represent multiple processors 703, 803 and/or multiple processor cores and the memories 706, 806 may represent multiple memories 706, 806 that operate in parallel processing circuits, respectively. In such a case, the local interface 709, 809 may be an appropriate network that facilitates communication between any two of the multiple processors 703, 803, between any processors 703, 803, and any of the memories 706, 806, or between any two of the memories 706, 806, etc. The local interfaces 709, 809 may comprise additional systems designed to coordinate this communication, including, for example, performing load balancing. The processors 703, 803 may be of electrical or of some other available construction.

Although the content delivery service 215, the device discovery service 218, the playback communication service 221, the browser 275, the content access application 278, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the content delivery service 215 and the playback communication service 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 703, 803 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215, the device discovery service 218, the playback communication service 221, the browser 275, and the content access application 278, that comprises software or code can be embodied in any non-transitory computer-readable medium for use by or in connection with an instruction execution system such as, for example, processors 703, 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 215, the device discovery service 218, the playback communication service 221, the browser 275, and the content access application 278, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program that, when executed by at least one computing device, causes the at least one computing device to at least:

render, upon a first display, a user interface relating to a video content feature, the user interface including a component facilitating selection of a target client device from a listing of target client devices, wherein the listing of target client devices is restricted to client devices for which the at least one computing device has permission to control playback;

receive a user selection of the target client device via the component;

in response to the user selection of the target client device, send a request to a server device to commence a playback of the video content feature upon a second display of the target client device;

receive periodic status updates from the server device identifying a current status in the playback of the video content feature upon the second display of the target client device, the periodic status updates originating from the target client device;

receive auxiliary content relating to the video content feature from the server device; and in a synchronization with the playback of the video content feature upon the second display of the target client device, render audio corresponding to the video content feature via an audio device associated with the first display and render the auxiliary content in the user interface on the first display, the synchronization being based at least in part on the periodic status updates.

2. The non-transitory computer-readable medium of claim 1, wherein the auxiliary content includes at least one of: biographical information, trivia information, supplemental video content, a quote, soundtrack information, or a description of a product available for ordering.

3. The non-transitory computer-readable medium of claim 1, wherein the program further causes the at least one computing device to share at least a portion of the auxiliary content with a social network in response to a user selection of the at least a portion of the auxiliary content for sharing, wherein the auxiliary content comprises at least one of: a scene from the video content feature or a quote from the video content feature.

4. The non-transitory computer-readable medium of claim 1, wherein the program further causes the at least one computing device to send a request to the server device to cease playback of the audio corresponding to the video content feature upon a second audio device of the target client device.

5. The non-transitory computer-readable medium of claim 1, wherein the audio corresponding to the video content feature via the audio device associated with the first display is in a different language than a language of the playback of the video content feature on the second display of the target client device.

6. A system, comprising:

a data store; and at least one computing device in communication with the data store, the at least one computing device being configured to at least:

receive a request from a first client device to commence a first playback of a video component of a content feature, the request identifying a second client device;

determine that the first client device has permission to control playback via the second client device according to at least one content control preference;

determine a current time in a second playback of the content feature via the first client device;

send an instruction to the second client device to commence the first playback of the video component of the content feature at the current time upon a display of the second client device in response to the request;

send an instruction to the first client device to cease playback of the video component of the content feature for the second playback via the first client device;

stream an audio component of the content feature to the first client device in synchronization with the first playback of the video component of the content feature; and relay periodic status updates from the second client device to the first client device, the periodic status updates regarding the first playback of the content feature by the second client device.

7. The system of claim 6, wherein the at least one computing device is further configured to:

receive a playback control command from the first client device; and send the playback control command to the second client device, the second client device being configured to implement the playback control command relative to the first playback of the video component of the content feature.

8. The system of claim 6, wherein the at least one computing device is further configured to:

receive a further request from the second client device to transfer the first playback of the content feature to a third client device; and send a further instruction to the third client device to commence a third playback of the content feature upon a display of the third client device in response to the further request, the third playback upon the display of the third client device being commenced at a current time in the first playback upon the display of the second client device.

9. The system of claim 6, wherein the at least one computing device is further configured to:

determine a set of target client devices that are configured to receive playback instructions from the first client device, the set of target client devices including the second client device; and send a listing of the set of target client devices to the first client device.

10. The system of claim 9, wherein the first client device is configured to render a user interface presenting the listing of the set of target client devices upon a display of the first client device.

11. The system of claim 9, wherein the set of target client devices is determined based at least in part on at least one of: a location of the first client device or a location of a respective target client device in the set of target client devices.

12. The system of claim 6, wherein the at least one computing device is further configured to stream the video component of the content feature to the first client device, wherein the first playback of the video component of the content feature upon the display of the second client device is synchronized to the second playback of the content feature upon the display of the first client device.

13. The system of claim 6, wherein the at least one computing device is further configured to send auxiliary content that is chronologically related to the first playback of the content feature to the first client device.

14. The system of claim 6, wherein the first client device and the second client device are coupled to different network segments, and broadcast network messages are unrouted between the different network segments.

* * * * *